Sept. 29, 1959
D. B. DOOLITTLE
2,906,476
AIRCRAFT BARRIER
Filed Aug. 19, 1955
2 Sheets-Sheet 1
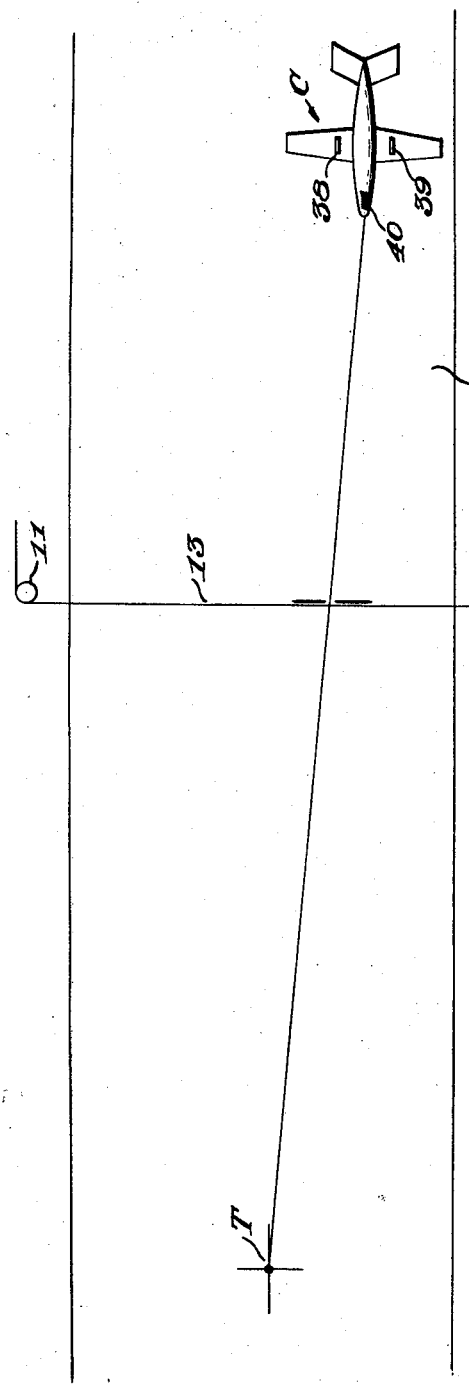
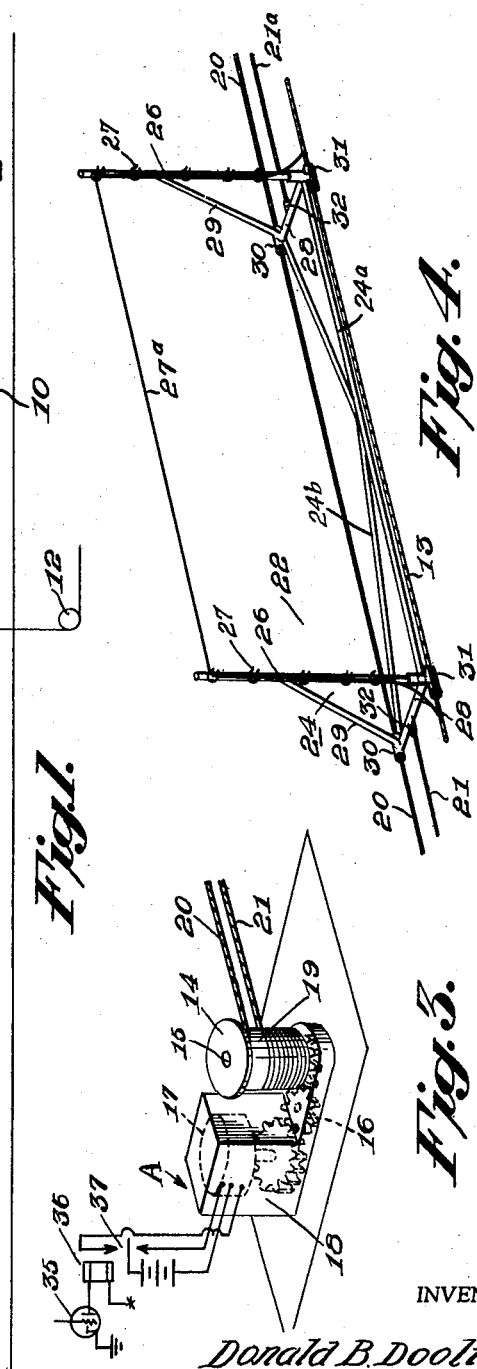
INVENTOR
Donald B. Doolittle
BY
ATTORNEY

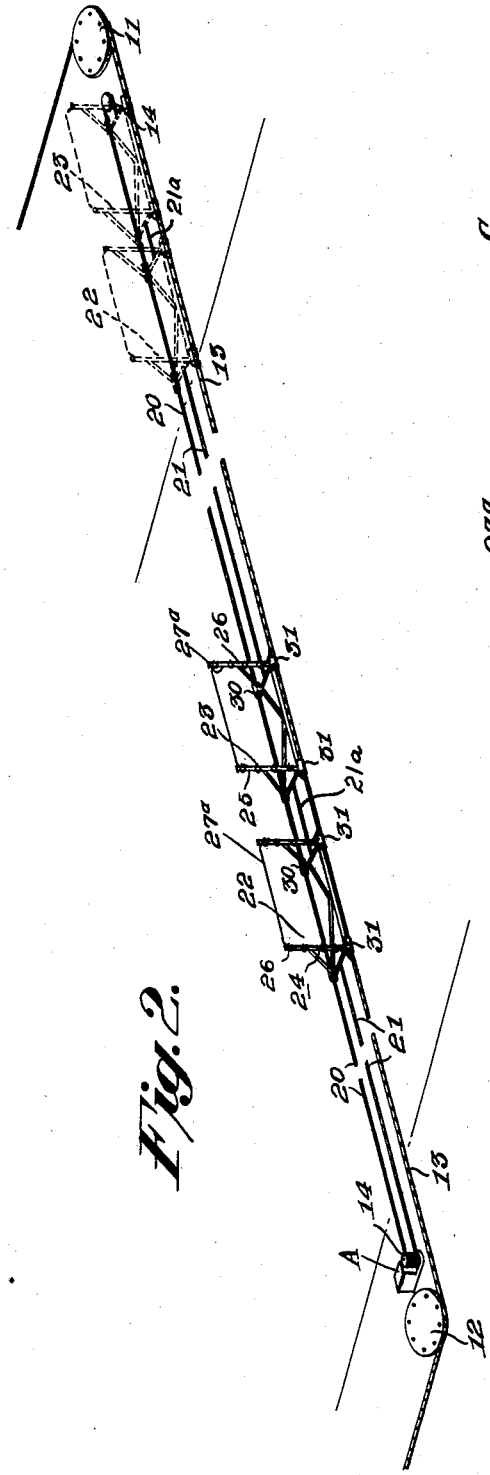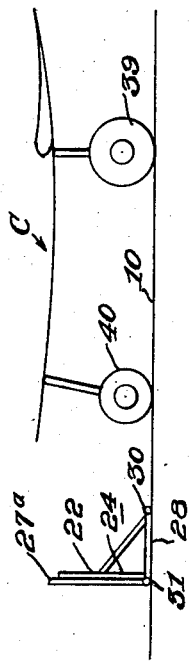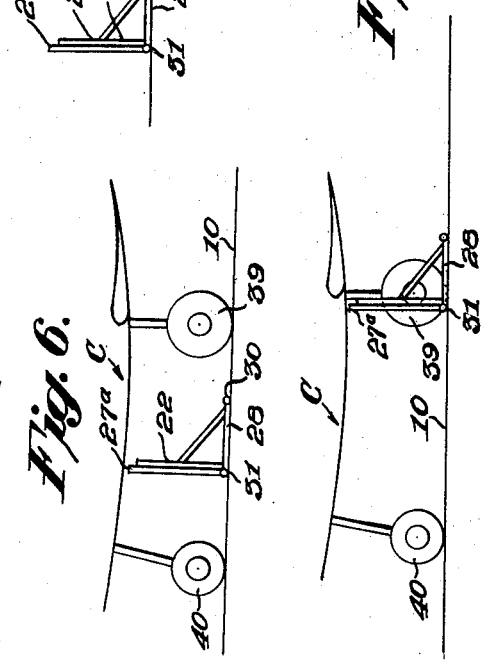

United States Patent Office 2,906,476
Patented Sept. 29, 1959

2,906,476

AIRCRAFT BARRIER

Donald B. Doolittle, Wilmington, Del., assignor to All American Engineering Company, Wilmington, Del., a corporation of Delaware Application August 19, 1955, Serial No. 529,456

8 Claims. (Cl. 244—110)

The present invention relates to an aircraft barrier and more particularly to a barrier adapted to be movably positioned for an arrest and movably de-positioned during idle non-arrest periods.

An object of the present invention is to provide a simple, economical and efficient aircraft barrier adjustable across the landing surface to conform to the positions of landing aircraft transversely of the runway.

Another object is to provide drive means for mechanically positioning the arrest means of the barrier across a runway for each type of aircraft to be arrested.

Another object is to provide a remotely controlled arrest means for aircraft runways and the like.

A further object is to provide relatively long longitudinally spaced wicket members, to thereby embrace the landing wheels of different aircraft with various sizes of tricycle landing gear.

Still another object is to provide an aircraft barrier adapted to be used in combination with a suitable type of arrest engine.

With these and other objects in view, the present invention consists in the construction, arrangement and combination of parts hereinafter described and particularly pointed out in the appended claims, it being understood that I do not intend to limit myself to the present details of construction.

In the drawings like parts throughout the several views are given like numerals and are thus identified in the following detailed description, wherein:

Figure 1 is a top plan diagrammatic view disclosing a runway, a beam emitting transmitter, an arresting means and a landing aircraft;

Figure 2 is a partial isometric view of the arresting means in arrest position;

Figure 3 is an enlarged isometric view of one form of operating means for positioning the barrier means with respect to the runway;

Figure 4 is an enlarged isometric view of one of the barrier means and the respective operating cable connections;

Figure 5 is a view of an aircraft undercarriage and a side elevation of the barrier means prior to passage of the nose wheel therebetween;

Figure 6 shows the nose wheel ahead of the barrier means with the rear wheels of the undercarriage about to be engaged by the barrier means;

Figure 7 discloses the rear wheels engaged with the barrier means for the final arrest operation.

Referring to the general layout disclosed in Figure 1 of the drawings, there is an aircraft landing surface 10, which may be any such surface, for example, a landing deck, mat or an ordinary terrain strip. Mounted on each side of the landing surface 10 are arresting gear sheaves 11 and 12 with an arresting cable 13 reeved around the same. The cable 13 at its free ends, not shown, is connected to an arrest engine of any suitable type. Also adjacent the sheave 12 is a barrier means control station A, see Figures 2 and 3.

The barrier means control station comprises a winch 14 rotatable with a driven shaft 15 from a gear train 16 driven by a reversible electric motor 17 mounted in the housing 18. The motor 17 is controlled by a local beam emitting transmitter T positioned on the runway 10 for guiding coaction with the usual automatic pilot and glide path control system of the incoming aircraft C. The winch 14 is rotatable in either a clockwise or a counterclockwise direction and reeved around the drum 19 of the winch 14 and the sheave B is a cable 20 having wicket engaging end portions 21.

The cables 13 and 20, see Figure 4, are in effect guide cables for the barrier means, which comprise loop supporting frame structures hereinafter referred to as wickets 22 and 23. Each wicket comprises a pair of horizontally spaced brackets or frame members 24 and 25, which are connected in horizontally spaced relation by a straight rod 24a and an angular rod 24b whose vertex engages said straight rod, said brackets each having the vertical leg 26 thereof provided with clip members 27 for receiving an end portion of a loop 27a. The ends of these loops are connected to the arrest cable 13 by suitable means. The vertical leg 26 connects to horizontal leg 28 extending from the aircraft approach side of the cable members, and an angled brace rod 29 is connected across the apex of the bracket to each leg. The opposite ends of each leg 28 are formed with runners, such as the slide fittings 30 and 31, through which freely extend the cable end portion 20 and the arresting cable 13, respectively. The opposite ends of the rods 24a and 24b are connected to said horizontal legs 28 adjacent said slide fitting 30 and 31. Intermediate the ends of each of the horizontal legs 28 is a coupling element 32, see Figure 4. These couplings 32 connect to the respective cable end portions 21, which, as one or the other is reeled in around the winch drum 19, serve to position the wickets 22 and 23 to and from barrier position with respect to the runway 10. The wickets are interconnected by a length of cable 21a.

The barrier wickets may be positioned manually in accordance with instructions from a landing aircraft relative to the proposed landing position thereof transversely of the runway but preferably the barrier wickets are automatically controlled as generally disclosed in Figure 3 by electronic means, such as the amplifier tube 35 and relay 36 in combination with reversible switch 37 to the electric motor 17, whereby power is transmitted to the winch means 14 through gear train 16.

The point T on the runway represents a glide path beam emitting transmitter which is located in the vicinity of the intersection of the landing path with the ground. The transmitter controls the barrier or wicket control station A on the ground having the reversible electric motor 17, which is responsive in combination with the received signal reflected from the landing aircraft. This signal supplies the necessary electrical energy to solenoid switch means 37 from a power generator circuit to drive the motor according to the reflected signal from the landing aircraft. The signal transmitted from the ground point T is reflected from the aircraft in a path to the motor station on the ground causing the wickets to move in accordance with the landing position of the aircraft. Thus the motor 17 operates to drive the arrest wickets 22 and 23 such distance as to intercept the rear landing wheels 38 and 39, as the aircraft is being landed by any suitable blind landing system. The nose wheel 40 passes between the wickets, see Figure 6.

Thus there is provided a barrier intended for use with conventional geared aircraft as well as with tricycle geared types. It consists of a main deck pendant and two mobile loops to engage the landing gear. These loops are positioned by electronic or manual means to intercept the conventional aircraft's main gear and provide a means of allowing the nose wheel of tricycle craft to pass through before catching the main gear. The operation is as follows:

As the aircraft approaches, a beam emitting tracking device aligns the loops to intercept the main gear. This is accomplished by means of the actuating winch means, which pull the loops and support frames or wickets 22 and 23 into the proper position. As the nose wheel 40 passes between the wickets, the main gear engages the loops 27ª of the wickets and they are released from the frames to arrest the aircraft by pulling forward on the pendant cable 13 connected to a suitable energy absorber.

During periods when the barrier is not in use the loops and frames are pulled clear of the runway and stored as indicated in dotted lines in Fig. 2.

No tracks or trenches are required for installation or existing facilities as the cables themselves guide and position the barrier loops.

While only one specific embodiment of the invention is hereinbefore set forth, it is to be expressly understood that the same is not to be limited to the details or construction and arrangement of the parts as illustrated and described because various modifications may be developed in putting the invention into practice within the scope of the appended claims.

What is claimed is:

1. Aircraft barrier undercarriage wheel wickets adapted to be mounted across an aircraft runway in the path of the landing wheels of a landing aircraft, and means for moving said wickets into alignment with the landing wheels of a landing aircraft, said means comprising winch and cable means connected to said wickets, and electronic control means coacting with said winch means to position said wickets in the path of the landing gear of said aircraft.

2. Aircraft barrier undercarriage wheel wickets adapted to be mounted across an aircraft runway in the path of the landing wheels of a landing aircraft, and means for moving said wickets into alignment with the landing wheels of a landing aircraft, said means comprising winch and cable means connected to said wickets, and electronic control means coacting with said winch means to position said wickets in the path of the landing gear of said aircraft, said electronic control means receiving beams from the landing aircraft.

3. An aircraft barrier comprising in combination with an arresting cable disposed transversely of a runway, longitudinally spaced frame members slidably disposed on said arresting cable, aircraft landing gear engageable loops detachably connected intermediate their ends to said frame members and having their ends connected to said arresting cable, and means including a winch, and cable connections between the winch and said frame members for moving same with said loops transversely of said runway.

4. An aircraft barrier comprising in combination with an arresting cable disposed transversely of a runway, a pair of longitudinally spaced frame members slidably disposed on said arresting cable, means interconnecting said frame members, said frame members each detachably supporting an aircraft landing gear engageable loop disposed in a vertical plane transversely of said runway, with the ends thereof engaged with said arresting cable, means for adjusting said frame members transversely of said runway and lengthwise of said arresting cable comprising a cable having the opposite ends thereof connected to opposed ends of said frame members, a winch including a drum about which a portion of said cable is wound, and means for selectively rotating said drum in opposite directions, with corresponding movements of said frame members transversely of said runway.

5. The structure according to claim 4 wherein adjacent ends of said frame members are interconnected by a relatively short length of cable.

6. The structure according to claim 4 wherein said frame members comprise horizontal legs having slide fittings on the opposite ends thereof, the said arresting cable extending freely through the fittings on corresponding ends of said legs and the central portion of said frame member adjusting cable extending freely through the fittings on the opposite ends of said legs.

7. The structure according to claim 4 wherein said frame members each comprise vertical legs and wherein said loop includes a horizontal portion and opposed vertical portions, said horizontal portion normally spanning the upper ends of said vertical legs, and clips removably connecting the said vertical portions to the vertical legs.

8. An aircraft barrier for operative association with an arresting cable extending transversely of a runway, comprising a pair of frames disposable longitudinally of said cable and each thereof including opposite end brackets, said brackets each including a horizontal leg and a vertical leg, slide fittings on the opposite ends of said horizontal legs, clip means on said vertical legs, a cable loop initially supported on each frame and including a horizontal portion spanning the upper ends of the respective vertical legs and opposite vertical portions removably engaged with said vertical legs by said clips, the free ends of said vertical portions having a sliding connection with said arresting cable, a length of cable interconnecting adjacent ends of said frames, the sliding fittings on corresponding ends of said horizontal legs slidably receiving said arresting cable, a frame adjusting cable having the major central portion thereof wound about a drum at one side of said runway, one end of said last cable being secured to an opposed end of one of said frames, the opposite end of said last cable being secured to the opposed end of the other of said frames, an end portion of said last cable adjacent said last end thereof extending loosely through the slide fittings at the opposite ends of said horizontal legs, and remotely controlled means for driving said drum in opposite directions for predetermined positioning of said frames transversely of said runway.

References Cited in the file of this patent

UNITED STATES PATENTS

| | | |
|---|---|---|
| 1,315,320 | Mesurier | Sept. 9, 1919 |
| 2,583,125 | Shannon | Jan. 22, 1952 |
| 2,712,912 | Hattan | July 12, 1955 |
| 2,783,957 | O'Neil et al. | Mar. 5, 1957 |